United States Patent [19]

Piejko et al.

[11] Patent Number: 5,112,910
[45] Date of Patent: May 12, 1992

[54] MIXTURES OF THERMOPLASTIC POLYMERS IN POWDER FORM

[75] Inventors: Karl-Erwin Piejko, Bergisch-Gladbach; Christian Lindner, Cologne; Ralph Ostarek, Düsseldorf; Hans-Eberhard Braese, Cologne; Karl-Heinz Ott, Leverkusen, all of Fed. Rep. of Germany

[73] Assignee: Bayer AG, Leverkusen, Fed. Rep. of Germany

[21] Appl. No.: 743,678

[22] Filed: Aug. 12, 1991

Related U.S. Application Data

[63] Continuation of Ser. No. 543,091, Jun. 25, 1990, abandoned.

[51] Int. Cl.$^5$ .............. C08L 33/06; C08L 9/00; C08L 47/00; C08L 51/04
[52] U.S. Cl. .................... 525/84; 525/228; 525/83; 525/192; 525/198; 525/234; 525/732; 525/234
[58] Field of Search .................... 525/228, 84

[56] References Cited

U.S. PATENT DOCUMENTS 4,522,959 6/1985 Lindner et al. ............ 525/228

Primary Examiner—Melvyn I. Marquis
Assistant Examiner—W. R. M. Clark
Attorney, Agent, or Firm—Connolly and Hutz

[57] ABSTRACT

Process for the preparation of mixtures of thermoplastic polymers in powder form from aqueous emulsions of
a) particulate, partly crosslinked rubber-like copolymers of a $C_2$–$C_8$-alkyl acrylate and/or butadiene with (based on the copolymer) up to 40 wt. % acrylonitrile, styrene or $C_1$–$C_4$-alkyl methacrylate,
b) a thermoplastic resin, and if appropriate
c) a rubber-rich graft polymer of styrene, α-methylstyrene, acrylonitrile, methyl methacrylate and/or alkyl acrylate on a diene or alkyl acrylate rubber having a rubber content of 50 to 95 wt. %, wherein aqueous emulsions of a) and b) and if appropriate c) having polymer contents of 15 to 50 wt. % are mixed with a coagulate solution simultaneously, but in separate streams, continuously or semi-continuously at 20° to 100° C., the polymers a) and b) and if appropriate c) being coagulated, the streams are combined and the polymer mixture is then separated off.

10 Claims, No Drawings

MIXTURES OF THERMOPLASTIC POLYMERS IN POWDER FORM

This application is a continuation of Ser. No. 07/543,091 filed Jun. 25, 1990, now abandoned.

The invention relates to a process for the preparation of mixtures of thermoplastic polymers containing crosslinked rubbers in powder form from aqueous emulsions of the polymers. The process is particularly simple industrially and provides non-tacky powders having improved free-flowing properties and storage stability. The further processing is thus also facilitated decisively.

Mixtures of rubbers, thermoplastic resins (e.g. copolymers of vinyl compounds) and if appropriate graft polymers of vinyl compounds on rubbers are industrially important thermoplastic moulding compositions.

Many of these rubbers, resins and graft polymers must be produced in aqueous emulsion and isolated therefrom, since in particular the rubbers and graft polymers should be present as discrete crosslinked microparticles in powder form.

To prepare the moulding compositions which contain rubbers, resins and graft polymers, the emulsions of the polymers obtained can be mixed and the mixture worked up. The polymer mixture thus obtained has advantageous properties for processing.

For mixtures in powder form the powder properties are important. For example, free-flowing properties are often required, the particle size distribution should be adjusted to suit certain requirements, and the powder should not tend to cake together and form lumps.

The powder properties can be influenced to a certain degree by particular—stepwise—coagulation, i.e. by certain successive coagulation steps—"gradient coagulation".

In EP-A 121 855, GB-PS 1 113 348 and GB-PS 1 568 469, mixtures of soft and hard polymer components in powder form are prepared by achieving, by means of "delayed" coagulation of the hard polymer, a type of encasing of the soft polymer contents which tend to stick together. EP-A 121 854 describes the formation of coarse-particled powder from fine-particled hard polymer by means of soft polymers in a "gradient coagulation.

These processes are expensive industrially and can be carried out only in special coagulation plants with appropriate industrial equipment.

It has been found that perfect pulverulent mixtures are obtained reproducibly and without expensive measurement and control techniques by co-coagulation of aqueous emulsions of certain polymers if the emulsions are coagulated simultaneously but separately and are mixed immediately after the coagulation.

The invention thus relates to a process for the preparation of mixtures of thermoplastic polymers in powder form from aqueous emulsions of a) particulate, partly crosslinked rubber-like copolymers of a $C_2$-$C_8$-alkyl acrylate and/or butadiene with (based on the copolymer) up to 40 wt. % acrylonitrile, styrene or $C_1$-$C_4$-alkyl methacrylate, which have average particle diameters ($d_{50}$) of 0.08 to 1.0 μm and gel contents of 40 to 99 wt. % and b) a thermoplastic resin which is a homo- or copolymer of styrene, α-methylstyrene, methyl methacrylate or acrylonitrile, and if appropriate contains up to 30 wt. % of a rubber, and if appropriate c) a rubber-rich graft polymer of styrene, α-methylstyrene, acrylonitrile, methyl methacrylate and/or alkyl acrylate on a diene or alkyl acrylate rubber having a rubber content of 50 to 95 wt. %, which is characterized in that aqueous emulsions of a) and b) and if appropriate c) having polymer contents of 15 to 50 wt. % are mixed with a coagulate solution simultaneously, but in separate streams, continuously or semi-continuously at 20° to 100° C., the polymers a) and b) and if appropriate c) being coagulated, the streams are combined and the polymer mixture is then separated off.

If a component c) is used, the emulsion thereof can be brought into contact with the coagulation solution separately - as a 3rd feed - or as a mixture with a) or b) or also divided amongst a) and b).

Under certain circumstances, it may also be advantageous partly to mix the emulsions of components a) and b), so that the separate streams consist of a) plus 0 to 50% b) plus 0 to 50% a). Preferably, however—in the absence of c)—one stream consists of proportions > 80% b), in particular of 100% b). The possible division of component c) amongst a) and/or b) depends on the composition thereof. At rubber contents > 80 wt. %, admixing to component a) is preferred. At rubber contents < 80 wt. %, portions of c) can be mixed with b).

Preferably, mixtures of 30 to 98 wt. % a), in particular 40 to 96 wt. % a), and 2 to 70 wt. % b), in particular 4 to 60 wt. % b), and 0 to 50 wt. % c), based on a)+b)+c), can be prepared.

At proportions of b) in the total mixture of > 10 wt. %, in particular > 20 wt. %, portions of the emulsion of b) are preferably admixed to that of a), so that the emulsions of b) are present as the 2nd feed in amounts such that the solids content thereof, based on the total solids, does not exceed 20 wt. %, in particular 10 wt. %.

The components a), b) and c) of the mixture prepared according to the invention are known.

The rubber-like copolymers a) of the invention are particulate, partly crosslinked copolymers of a $C_2$-$C_8$-alkyl acrylate (in particular butyl acrylate or pentyl, hexyl or 2-ethylhexyl acrylate) and/or butadiene with up to 40 wt. % incorporated acrylonitrile, styrene or $C_1$-$C_4$-alkyl methacrylate, preferably with 20 to 35 wt. % of these monomers. These rubbers have average particle diameters ($d_{50}$) of 0.08 to 1.0 μm and gel contents of 40 to 99 wt. %, in particular of 75 to 99 wt. %. They are known and can be prepared by free radical emulsion polymerization of mixtures of up to 40 wt. % acrylonitrile, styrene or $C_1$-$C_4$-alkyl methacrylate and 100 to 60 wt. % alkyl acrylate and/or butadiene at temperatures of > 30° C. Particular conditions must be observed for establishing the partial crosslinking. Crosslinking (expressed by the gel content) with a relatively low crosslinking density (expressed by the swelling index) is required. This property combination is obtained e.g. if up to 1 wt. % polyfunctional copolymerizable allyl compounds, in particular triallyl compounds, such as triallyl isocyanurate, are also used in the emulsion polymerization of acrylate monomers.

If butadiene is used as a monomer, polyfunctional vinyl or allyl monomers can be dispensed with if the emulsion polymerization is carried out such that butadiene itself acts as the crosslinking agent (e.g. by copolymerization at high temperatures—more than 40° C., or even more than 60° C. or by polymerization up to very high conversions).

Components b) are thermoplastic resins, i.e. homo- or copolymers of styrene, α-methylstyrene, methyl methacrylate or acrylonitrile; copolymers of styrene and acrylonitrile, of α-methylstyrene and acrylonitrile, of styrene, α-methylstyrene and acrylonitrile, of methyl methacrylate and styrene and of methyl methacrylate and acrylonitrile as well as polymethyl methacrylate are particularly suitable. Particularly suitable resins in the sense of the invention contain at least 50 wt. % styrene or α-methylstyrene or consist of methyl methacrylate portions of >80 wt. %. Component b) also includes those resins which contain a small amount of a copolymerized rubber; suitable rubbers are known particulate, partly crosslinked diene rubbers or alkyl acrylate rubbers; the resin-forming monomers are graft-polymerized onto the rubber.

The rubber content of component b) should not exceed 30 wt. % in any case.

The component c) contained in the mixture if appropriate is a rubber-rich graft polymer of vinyl compounds on a partly crosslinked, particulate rubber having average particle diameters ($d_{50}$) of 0.05 to 1 μm; graft-polymerized vinyl compounds are styrene, α-methylstyrene, acrylonitrile, methyl methacrylate and alkyl acrylate or mixtures thereof; methyl methacrylate and mixtures of styrene and acrylonitrile, of α-methylstyrene and acrylonitrile, of methyl methacrylate and styrene, of methyl methacrylate and alkyl acrylate and of α-methylstyrene, methyl methacrylate and acrylonitrile are particularly preferred. Possible rubbers of components c) (graft bases) are diene mono- and copolymers, e.g. of butadiene, isoprene or chloroprene, if appropriate with up to 35 wt. % comonomers, such as styrene, acrylonitrile, methyl methacrylate, alkyl acrylate or vinyl methyl ether, or alkyl acrylate polymers (in particular of $C_1$–$C_8$-alkyl acrylates), which if appropriate contain up to 20 wt. % copolymerized vinyl monomers, such as styrene, acrylonitrile, vinyl acetate and $C_1$–$C_8$-alkyl methacrylate; the acrylate rubbers are usually partly crosslinked by copolymerization of polyfunctional vinyl or allyl monomers; crosslinking monomers are e.g. bis-acrylates, bis-acrylamides, butadiene, vinyl acrylate, triallyl cyanurate, triallyl isocyanurate, trisallyl citrate and vinyl bis-carboxylate.

The acrylate rubbers contain the crosslinking monomers in amounts of up to not more than 5 wt. %. The rubbers in component c) can also have a core/jacket structure, i.e. the acrylate rubber particles contain a core of a rubber other than the acylate rubber surrounding them, or a core of a hard thermoplastic resin.

Component c) in general contains 50 to 95 wt. % rubber, preferably 60 to 85 wt. %.

Components a), b) and c) can be prepared in a known manner by emulsion polymerization in aqueous media or emulsion grafting polymerization in the presence of rubber latices. In the case of rubber-free polymers b), the monomers are subjected to free radical polymerization in the presence of soaps (emulsifiers) in an aqueous medium at pH values of about 12 to 2, in particular 10 to 3. Possible initiators are, in particular, water-soluble agents which form free radicals, such as peroxodisulphates, peroxodiphosphates, water-soluble hydroperoxides and peroxo acids, as well as redox initiator systems. The polymerization, which is usually carried out at 40° to 90° C., requires the presence of an ionic emulsifier, in particular an anionic emulsifier, in amounts of up to 4 wt. %, preferably up to 2 wt. %, based on the monomers. Examples of suitable emulsifiers are fatty acid salts, alkylsulphonic acid salts with longer-chain alkyl radicals and sulphuric acid alkyl half-esters with longer-chain alkyl radicals.

To prepare graft polymers on rubbers, the monomers to be grafted on can be polymerized in the presence of an aqueous rubber emulsion in the same way as described above.

Aqueous emulsions a), b) and if appropriate c) having polymer solids contents of 15 to 50 wt. %, preferably 20 to 40 wt. %, are employed for the process according to the invention, and emulsions of a), b) and if appropriate c) with about the same polymer solids content, preferably about 30 to 40 wt. %, are particularly advantageously to be employed for carrying out the process according to the invention.

The process according to the invention can be carried out as follows: The latices of components a), b) and if appropriate c) are fed separately, while stirring, into one or more reactors connected in series in a continuous or discontinuous process. The reactor contains an aqueous coagulation solution. "Fed separately" means that the emulsions are introduced into the reactor such that they enter the coagulation solution without mixing. This can be achieved by metering in the emulsions via separate feeding devices at different point in the reactor. The process is carried out at temperatures of 20° to 100° C. The temperature preferably reaches values of 60° to 100° C. at the end of the coagulation or in the last stage of the process. A procedure in which the final temperature of the coagulation is at least 40° C. higher than the initial temperature is preferred, especially in cases where the resulting mixture consists of proportions of >80 wt. % a). The coagulation solutions used are aqueous solution of water-soluble inorganic or organic acids and/or salts, such as hydrochloric acid, sulphuric acid, phosphoric acid, formic acid, acetic acid, propionic acid and alkali metal and alkaline earth metal chlorides, sulphates, formates, acetates and phosphates. 0.5 to 15 wt. % aqueous solutions are generally used, depending on the latex mixture to be coagulated. The coagulation solution, emulsion of a), emulsion of b) and if appropriate c) must be mixed intensively at the stated temperature, the mixture preferably being stirred so vigorously that highly turbulent flows are formed.

If the process is carried out in several reactors connected in series, the emulsions are advantageously metered into the first reactor; the polymer slurry in water formed during the coagulation can be after-treated in the subsequent reactors at the same temperatures as in the first reactor or preferably at higher temperatures. The particle structure of the polymer powder and the particle size distribution can be improved by this after-treatment. The process according to the invention requires residence times from 15 minutes to 5 hours, preferably from 1 hour to 3 hours.

Compared with the known stepwise coagulation processes, the process according to the invention has the advantage that no precipitation suspension of the pure rubbers (component a)) in which, especially with only partly crosslinked rubbers, there is a marked tendency of the particles to stick, is obtained and has to be handled (1st stage of the known process). In this unstable stage, a permanent change in the particle sizes towards coarse particles may thus occur, which means that a very wide particle size distribution may form, up to extremely coarse particles. A reproducible particle size distribution can in these cases be achieved only with expensive control of the precipitation conditions. Moreover, coarser particles formed in the first stage of the known processes can be divided again, after powdering in the second stage, in the course of the further working up process, which means that non-powdered surfaces are exposed, which leads to sticking together with other particles.

The polymer slurry primarily formed can be separated off in the customary manner, e.g. by filtration or centrifugation, and then washed and dried.

This gives pulverulent polymer mixtures of improved particle size distribution, which manifests itself, for example, by free-flowing properties, good storage stability and thermoplastic processability. Since the polymer mixtures are used as additives to known thermoplastics, such as polyvinyl chloride and ABS, in order to improve the properties thereof, e.g. toughness and elongation properties, it is critical that the powder can easily be fed into continuously operating processing devices for thermoplastics, mixes with the melt of the thermoplastic at high temperatures and is uniformly distributed or dissolved therein. The products according to the invention have these properties.

The Staudinger indices were determined in dimethylformamide (in this context c.f. M. Hoffman et al., "Polymeranalytik I und II (Polymer Analysis I and II)", Georg Thieme Verlag, Stuttgart, 1977). The particle diameters are $d_{50}$ values and are determined by ultracentrifuge measurement (in this context c.f. W. Scholtan et al., Kolloidz. und Z. Polymere 250 (1972)).

EXAMPLES

I. Emulsions Employed

Component a 1

Emulsion of a rubber copolymer of 30 wt. % acrylonitrile and 70 wt. % 1,3-butadiene having an average particle diameter ($d_{50}$ value) of 0.125 μm and a gel content of 92% (in DMF). The emulsion has a solids content of 28 wt. %.

Component a 2

Emulsion of a rubber copolymer of 30 wt. % acrylonitrile and 70 wt. % butyl acrylate having an average particle diameter ($d_{50}$) of 0.2 μm and a gel content of 93 wt. %. The copolymer emulsion was obtained by crosslinking terpolymerization with triallyl cyanurate. It has a solids content of 38 wt. %.

Component b 1

Emulsion of a copolymer of 28 wt. % acrylonitrile and 72 wt. % styrene having a solids content of 34 wt. %. The copolymer isolated has a Staudinger index (determined in DMF at 23° C.) of 0.7 dl/g.

Component b 2

Emulsion of a polymer of methyl methacrylate having a solids content of 33 wt. %. The polymer isolated has a Staudinger index (determined in DMF at 23° C.) of 0.5 dl/g.

Component c

Emulsion of a graft polymer of 60 wt. % of a rubber base of n-butyl acrylate, partly crosslinked with triallyl cyanurate and having an average particle size ($d_{50}$ value) of 0.5 μm and a gel content of 90 wt. %, and 40 wt. % of a monomer mixture, graft-polymerized onto this, of 72 wt. % styrene and 28 wt. % acrylonitrile. The emulsion has a solids content of 34 wt. %.

II. Coagulation to Pulverulent Polymer Mixtures

The following experiments for coagulation and isolation are carried out with a total of 1,000 parts by wt. polymer. The coagulation agent is a solution of 5,000 parts by wt. water and 200 parts by wt. magnesium sulphate. Coagulation is carried out at 90° C.

II.1 Process According to the Invention

Examples II.1.1–II.1.3

The emulsions of polymer a) and of polymer b) corresponding to the solids contents shown in Table 1 are metered into the coagulating agent, which is heated at 90° C., via separate feed devices in the course of ½ hours, while stirring rapidly with a propeller stirrer, and stirring is then continued at 90° C. for ½ hour.

TABLE 1

| Experiment no. | Feed 1 Emulsion/wt. content based on the solids | Feed 2 Emulsion/wt. content based on the solids |
| --- | --- | --- |
| II.1.1 | a 1/900 | b 1/100 |
| II.1.2 | a 1/950 | b 2/50 |
| II.1.3 | a 2/900 | b 2/100 |

Example II.1.4

A mixture of 400 parts by wt. a 2 (parts by wt. based on the solids of the emulsions) and 450 parts by wt. c is employed as feed 1 and 150 parts by wt. b 1 are employed as the 2nd feed analogously to examples II.1.1–II.1.3.

Example II.1.5

950 parts by wt. (based on the solids) a 2 and 50 parts by wt. b 1 are metered separately into the coagulating agent at 30° C. analogously to examples II.1.1–II.1.3. The mixture is then heated to 90° C, with further stirring, and stirring is continued for about 15 min.

II.2 Comparison experiments II.2.1–II.2.4

Examples II.1.1–II.1.4 are repeated, but the emulsions employed are mixed with one another and metered as a mixture into the coagulating agent. The other conditions are as stated above.

III. Working Up and Properties of the Polymers

For further working up of the polymer suspensions prepared according to II.1 and II.2, these are centrifuged in a centrifuge, Carl Padberg, model GZ 300 (internal diameter 300 mm; 1,400 rpm), washed with water for 15 min until practically free from electrolytes and centrifuged dry for 15 min. The moist material obtained is evaluated visually (see Tab. 2) and dried at 60° C. The dry polymer is evaluated visually again and subjected to a pressure loading test. For this, a cylindrical tube of internal diameter 54 mm and height 60 mm is filled with powder up to a filling height of 40 mm and the powder is loaded with a stamp (diameter 51 mm) weighing 3.6 kg for 24 h at room temperature. The contents of the tube are then carefully forced out from the bottom and evaluated: readily flowing powders then form a conical heap (rating +), whereas caking or formation of lumps leads to geometries which deviate from this. In the extreme case (rating −), a column-shaped body is obtained.

TABLE 2

Properties of the moist and dried polymers

| Example No. | Moist material | Dry material | Loading test |
|---|---|---|---|
| II.1.1 | crumbly | flaky | + |
| II.1.2 | fibrous | flaky | + |
| II.1.3 | crumbly | flaky | + |
| II.1.4 | powdery | fine-particled | + |
| II.1.5 | powdery | fine-particled | + |
| II.2.1 | hard, stuck together | rubber-like mass | − |
| II.2.2 | hard, stuck together | rubber-like mass | − |
| II.2.3 | hard, stuck together | rubber-like mass | − |
| II.2.4 | partly stuck together, coarse-particled | coarse agglomerates | − |

We claim:

1. A process for the preparation of mixtures of thermoplastic polymers in powder form from aqueous emulsions of
  a) particulate, partly cross-linked rubber-like copolymers of a $C_2$-$C_8$-alkyl acrylate and/or butadiene with (based on the copolymer) up to 40 wt. % acrylonitrile, styrene or $C_1$-$C_4$-alkyl methacrylate, which have average particle diameters ($d_{50}$) of 0.08 to 1.0 μm and gel contents of 40 to 99 wt. % and
  b) a thermoplastic resin which is a homo- or copolymer of styrene α-methylstyrene, methyl methacrylate or acrylonitrile, consisting essentially of:
    separately but simultaneously feeding into a single reactor containing a coagulation solution an aqueous emulsion of a) and an aqueous emulsion of b), having polymer contents of 15 to 50 wt. %;
    mixing the emulsions a) and b) in the coagulation solution while the coagulates of emulsions a) and b) are forming at 20° to 100° C.; and
    separating off the coagulated polymer mixture.

2. The process of claim 1 wherein 30 to 98 wt. % aqueous emulsion a) and 2 to 70 wt. % aqueous emulsion b), based on a) and b), are employed.

3. The process of claim 1 wherein the emulsions a) and b) in the coagulation solution are mixed by stirring.

4. A process for the preparation of mixtures of thermoplastic polymers in powder form from aqueous emulsions of
  a) particulate, partly cross-linked rubber-like copolymers of a $C_2$-$C_8$-alkyl acetate and/or butadiene with (based on the copolymer) up to 40 wt. % acrylonitrile, styrene or a $C_1$-$C_4$-alkyl methacrylate, which have average particle diameters ($d_{50}$) of 0.08 to 1.0 μm and gel contents of 40 to 99 wt. % and
  b) a thermoplastic resin which is a homo- or copolymer of styrene, α-methylstyrene, methyl methacrylate or acrylonitrile and contains up to 30 wt. % of a rubber, and
  c) a rubber-rich graft polymer of styrene, α-methylstyrene, acrylonitrile methyl methacrylate and/or alkyl acrylate on a diene or alkyl acrylate rubber having a rubber content of 50 to 95 wt. %, consisting essentially of:
    separately but simultaneously feeding into a single reactor containing a coagulation solution an aqueous emulsion of a) and an aqueous emulsion of b) and an aqueous emulsion of c), having polymer contents of 15 to 50 wt. %;
    mixing the emulsions a), b) and c) in the coagulation solution while the coagulates of emulsions a), b) and c) are forming at 20° to 100° C.; and
    separating off the coagulated polymer mixture.

5. The process of claim 4 wherein 30 to 98 wt. % aqueous emulsion a) and 2 to 70 wt. % aqueous emulsion b), based on a) and b), are employed.

6. The process of claim 4 wherein the emulsions a), b) and c) in the coagulation solution are mixed by stirring.

7. Mixtures of thermoplastic polymers in powder form obtained according to claim 1.

8. Mixtures of thermoplastic polymers in powder form obtained according to claim 4.

9. A process for the preparation of mixtures of thermoplastic polymers in powder form from aqueous emulsions of
  a) particulate, partly cross-linked rubber-like copolymers of $C_2$-$C_8$-alkyl acrylate and/or butadiene with (based on the copolymer) up to 40 wt. % acrylonitrile, styrene or $C_1$-$C_4$-alkyl methacrylate, which have average particle diameters ($d_{50}$) of 0.08 to 1.0 μm and gel contents of 40 to 99 wt. %, and
  b) a thermoplastic resin which is a homo- or copolymer of styrene, α-methylstyrene, methyl methacrylate or acrylonitrile and contains up to 30 wt. % of a rubber, and
  c) a rubber-rich graft polymer of styrene, α-methylstyrene, acrylonitrile, methyl methacrylate and/or alkyl acrylate on a diene or alkyl acrylate rubber having a rubber content of 50 to 95 wt. %, consisting essentially of:
    separately but simultaneously feeding into a single reactor containing a coagulation solution;
    (I) a mixture of an aqueous emulsion of a) and an aqueous emulsion of c), and (II) an aqueous emulsion of b), said emulsions a), b), and c) having polymer contents of 15 to 50 wt. %;
    mixing the emulsions a), b) and c) in the coagulation solution while the coagulates of emulsions a), b) and c) are forming at 20 to 100° C; and
    separating off the coagulated polymer mixture.

10. A process for the preparation of mixtures of thermoplastic polymers in powder form from aqueous emulsions of
  a) particulate, partly cross-linked rubber-like copolymers of a $C_2$-$C_8$-alkyl acrylate and/or butadiene with (based on the copolymer) up to 40 wt. % acrylonitrile, styrene or $C_1$-$C_4$-alkyl methacrylate, which have average particle diameters ($d_{50}$) of 0.08 to 1.0 μm and gel contents of 40 to 99 wt. % and
  b) a thermoplastic resin which is a homo- or copolymer of styrene, α-methylstyrene, methyl methacrylate or acrylonitrile and contains up to 30 wt. % of a rubber, and
  c) a rubber-rich graft polymer of styrene, α-methylstyrene, acrylonitrile, methyl methacrylate and/or alkyl acrylate on a diene or alkyl acrylate rubber having a rubber content of 50 to 95 wt. %, consisting essentially of:
    separately but simultaneously feeding into a single reactor containing a coagulation solution;
    (I) a mixture of an aqueous emulsion of b) and an aqueous emulsion of c) and (II) an aqueous emulsion of a), said emulsions a), b) and c) having polymer contents of 15 to 50 wt. %;
    mixing the emulsions a), b) and c) in the coagulation solution while the coagulates of emulsions a), b) and c) are forming at 20° to 100° C.; and
    separating off the coagulated polymer mixture.

* * * * *